(12) United States Patent
Williams

(10) Patent No.: US 7,421,649 B1
(45) Date of Patent: Sep. 2, 2008

(54) ENHANCED VISUAL TABLE EDITING

(75) Inventor: Heidi Bauer Williams, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 971 days.

(21) Appl. No.: 10/424,561

(22) Filed: Apr. 28, 2003

(51) Int. Cl.
G06F 15/00 (2006.01)
G06F 17/00 (2006.01)

(52) U.S. Cl. .................................. 715/234; 715/238

(58) Field of Classification Search ................ 715/509, 715/517, 525, 503
See application file for complete search history.

(56) References Cited

U.S. PATENT DOCUMENTS

| | | | | |
|---|---|---|---|---|
| 5,845,299 A | * | 12/1998 | Arora et al. | 715/513 |
| 5,893,127 A | * | 4/1999 | Tyan et al. | 715/513 |
| 5,911,145 A | * | 6/1999 | Arora et al. | 715/514 |
| 6,121,963 A | * | 9/2000 | Ange | 715/500.1 |
| 6,230,174 B1 | * | 5/2001 | Berger et al. | 715/513 |
| 6,247,018 B1 | * | 6/2001 | Rheaume | 707/102 |
| 6,311,196 B1 | * | 10/2001 | Arora et al. | 715/513 |
| 6,424,979 B1 | * | 7/2002 | Livingston et al. | 715/511 |
| 6,446,098 B1 | * | 9/2002 | Iyer et al. | 715/513 |
| 6,565,609 B1 | * | 5/2003 | Sorge et al. | 715/503 |
| 6,569,208 B2 | * | 5/2003 | Iyer et al. | 715/513 |
| 6,570,585 B1 | * | 5/2003 | Hines et al. | 715/716 |
| 6,639,611 B1 | * | 10/2003 | Leduc | 715/764 |
| 6,675,351 B1 | * | 1/2004 | Leduc | 715/503 |
| 6,820,235 B1 | * | 11/2004 | Bleicher et al. | 715/501.1 |
| 6,865,720 B1 | * | 3/2005 | Otani et al. | 715/503 |

OTHER PUBLICATIONS

Raggett, Dave; Le Hors, Armaud; Jacobs, Ian; HTML 4.01 Specification; Dec. 24, 1999; W3C; Chapter 11.*

* cited by examiner

*Primary Examiner*—Doug Hutton
*Assistant Examiner*—Nathan Hillery
(74) *Attorney, Agent, or Firm*—Fulbright & Jaworski L.L.P.

(57) ABSTRACT

A system and method for editing a table within a hypertext markup language (HTML) editor is described, the method comprising analyzing code representing the table to determine dimension parameters based on content of the table, storing the dimension parameters in a memory, receiving edit indications from a user, concurrently comparing the edit indications against the dimension parameters, wherein edit indications that exceed the dimension parameters are rejected, and updating each instance of the dimension parameters within the code with the edit indications.

20 Claims, 3 Drawing Sheets

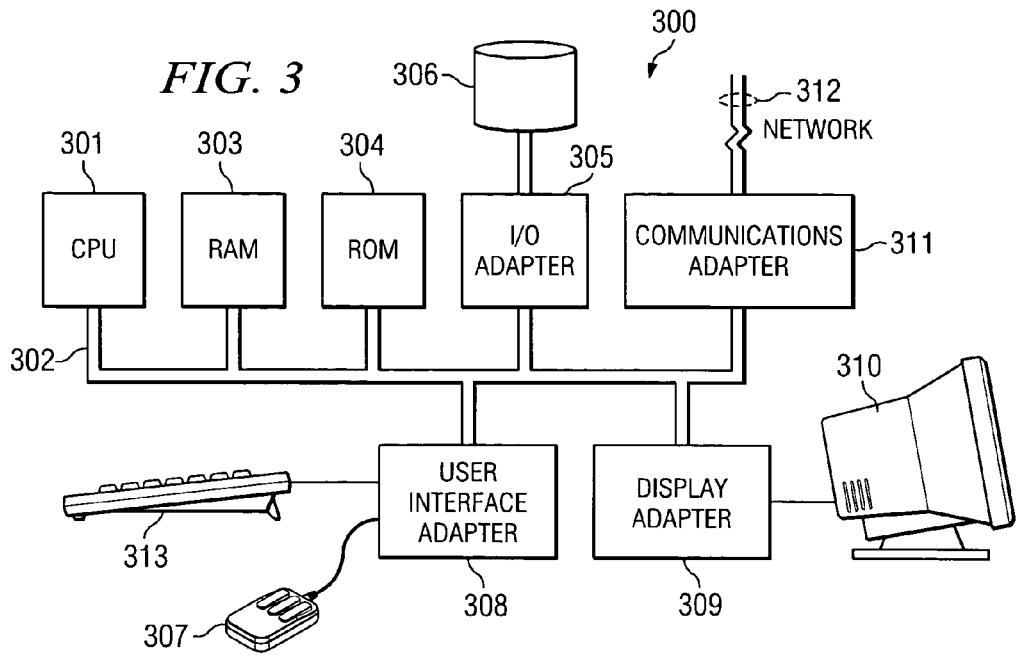

FIG. 3

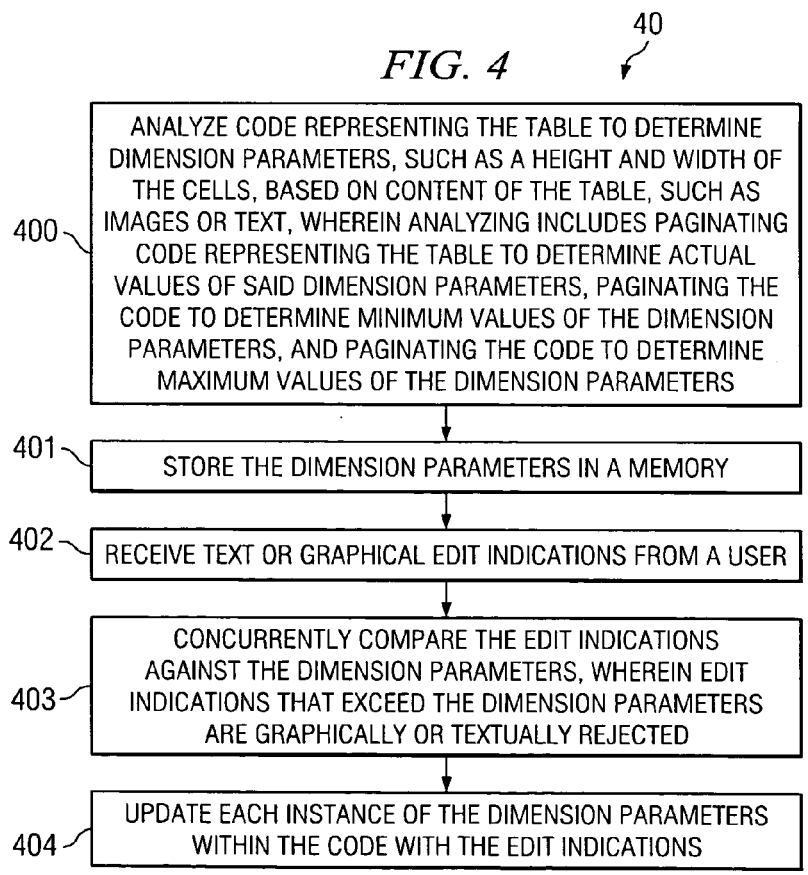

FIG. 4

400 — ANALYZE CODE REPRESENTING THE TABLE TO DETERMINE DIMENSION PARAMETERS, SUCH AS A HEIGHT AND WIDTH OF THE CELLS, BASED ON CONTENT OF THE TABLE, SUCH AS IMAGES OR TEXT, WHEREIN ANALYZING INCLUDES PAGINATING CODE REPRESENTING THE TABLE TO DETERMINE ACTUAL VALUES OF SAID DIMENSION PARAMETERS, PAGINATING THE CODE TO DETERMINE MINIMUM VALUES OF THE DIMENSION PARAMETERS, AND PAGINATING THE CODE TO DETERMINE MAXIMUM VALUES OF THE DIMENSION PARAMETERS

401 — STORE THE DIMENSION PARAMETERS IN A MEMORY

402 — RECEIVE TEXT OR GRAPHICAL EDIT INDICATIONS FROM A USER

403 — CONCURRENTLY COMPARE THE EDIT INDICATIONS AGAINST THE DIMENSION PARAMETERS, WHEREIN EDIT INDICATIONS THAT EXCEED THE DIMENSION PARAMETERS ARE GRAPHICALLY OR TEXTUALLY REJECTED

404 — UPDATE EACH INSTANCE OF THE DIMENSION PARAMETERS WITHIN THE CODE WITH THE EDIT INDICATIONS

ENHANCED VISUAL TABLE EDITING

The present invention relates, in general, to hypertext markup language (HTML) editors and, more specifically, to enhanced visual table editing.

BACKGROUND OF THE INVENTION

HTML is a markup language that uses tags on data to define the formatting of that data. HTML is the language of the Web describing to Web browsers how to present the content of the Web page to the user. Tables are a primary feature of HTML used to design and develop the presentation of a Web site. Information and material may be placed into tables for display by the Web browser. HTML editors are commonly used by Web designers to generate the HTML code for Web pages and Web sites. Modern Web pages and Web sites also include considerable embedded non-HTML code or script. However, HTML still forms the basis for much of the Web.

HTML editors have evolved from simple code editors to visual editors that render the HTML to the designer and allows the designer to visually edit the design while letting the HTML editor automatically generate the underlying HTML code. Some HTML editors, such as MACROMEDIA's DREAMWEAVER™, MICROSOFT CORPORATION's FRONTPAGE™, and the like, allow editing in both a visual and a code view either separately or concurrently. In working with tables in HTML editors, it is often easy to wind up with inconsistent values in the table formatting parameters, such as cell height and width and table height and width. This leads to unpredictable results when viewing the Web page in a browser (e.g., Internet Explorer or Netscape Navigator).

An HTML table is generally made up of several HTML tags, there is a <table> tag that delineates the table, and then there are rows, which are expressed with a <tr> tag. Each cell of the table is expressed with a <td> tag. A column is basically defined as the cells that are visibly displayed vertically when the HTML is rendered in a browser. However, the column code actually corresponds to the first <td> tag of every row, the second <td> tag of every row, and so on.

The content of a table is defined inside of a table cell, expressed with the <td> tag. The visual width and height of a table cell are usually defined by the width and height attributes of the <td> tag. Table cell heights and widths are constrained by the cell content. The visible cell height or width may be larger than the explicit width or height attribute if the cell content is bigger than the explicit width or height. For example, if an image within a cell is 100 pixels high, then the table cell and the table row cannot typically be any shorter than 100 pixels even if the explicit height is less than 100 pixels, but it could be bigger if the explicit height is greater than 100 pixels.

Visual HTML editors have table editing functionality but many of them do not typically create clean table code that is consistent across the table. Such inconsistencies tend not to work well on the browser, such that the table will often not look the same in the browser as it does in the editor (or will not look the same in different browsers or on different platforms). In many visual editors, a user will attempt to resize a column by dragging its border. However, because many of the cells in the column may have inconsistent widths or contain content, when the user drops the border, it sometimes will snap to a completely different, unexpected position.

An example of an inconsistent parameter would be to manually set a cell width of 10 pixels, but then actually place an image within that cell that is wider than 10 pixels. Therefore, the explicit width is inconsistent with the actual width that is seen. However, there is no way that the cell can be 10 pixels wide, so in the previous editors, when a user drags the column border to resize the column at some width around 10 pixels, the editor displays the editing to the user as the user drags the border. The editor observes that the image is much wider than 10 pixels (e.g. 90 pixels) and determines that the column cannot be 10 pixels wide. Therefore, as the user releases the column border, the editor would automatically place the column width at a reasonable width, such as 100 pixels, to accommodate the larger image. However, to the user, it appears that the column width snapped to a position that had nothing to do with the user's attempt to visually edit.

Most visual table editors insert height and width attributes into every cell in the table when the table is resized. While such table editors may allow a designer to manually enter or change the width/height in one cell or column, as soon as the table is visually resized, the table editor would add the resized width to every cell. This makes the table larger and have more lines of code than necessary. Furthermore, each of the user's manual entries is generally changed when a visual resize is done. Thus, if the user continues to make manual edits and visual edits, the chance exists that the resulting table include various different size parameters, height or width, for all of the cells. This causes inconsistent rendering of the table in browsers.

BRIEF SUMMARY OF THE INVENTION

The goal of this invention is to make visual table editing something that professional code authors can trust. Through minimizing the number of width and height attributes that are set on table cells and preventing people from visually creating inconsistent column widths, overall visual table editing is easier, more predictable and more trustworthy. Better visual feedback to let people know what is happening to their table code (this is an example of not letting them resize it smaller if it is not possible to resize it smaller), keeping the width/height attributes consistent within a table when resizing the table and optimizing the placement of the width/height attributes in the code (so if you made some edit to your table, it wouldn't suddenly resize to something different than what it was before) lets people trust that clean table code is being generated.

Representative embodiments of the present invention are directed to a method for editing a table within a hypertext markup language (HTML) editor, the method comprising analyzing code representing the table to determine dimension parameters based on content of the table, storing the dimension parameters in a memory, receiving edit indications from a user, concurrently comparing the edit indications against the dimension parameters, wherein edit indications that exceed the dimension parameters are rejected, and updating each instance of the dimension parameters within the code with the edit indications.

Further representative embodiments of the present invention are directed to a computer program product having a computer readable medium with computer program logic recorded thereon, the computer program product comprising code for analyzing cell contents of the table to determine measurements of the table, code for storing the measurements in a data structure, code for receiving edits from a user, code for comparing the edits against the measurements, wherein edits that exceed the measurements are rejected, and code for updating each instance of the measurements with the edit indications.

Additional representative embodiments of the present invention are directed to a table editor within a hypertext markup language (HTML) editor, the table editor comprising means for determining width and height cell attributes of the table, means for storing the width and height cell attributes in a data structure based on cell contents, means for reading edits from a user, means for comparing the edits against the width and height cell attributes, wherein edits that exceed the width and height cell attributes are ignored, and means for updating each instance of the width and height cell attribute with corresponding ones of the edit indications.

BRIEF DESCRIPTION OF THE DRAWINGS

FIG. 3 illustrates a computer system adapted to use the present invention; and

FIG. 4 is a flowchart illustrating a representative method and the steps executed in implementing one embodiment of the present invention.

DETAILED DESCRIPTION OF THE INVENTION

Figure 1A:
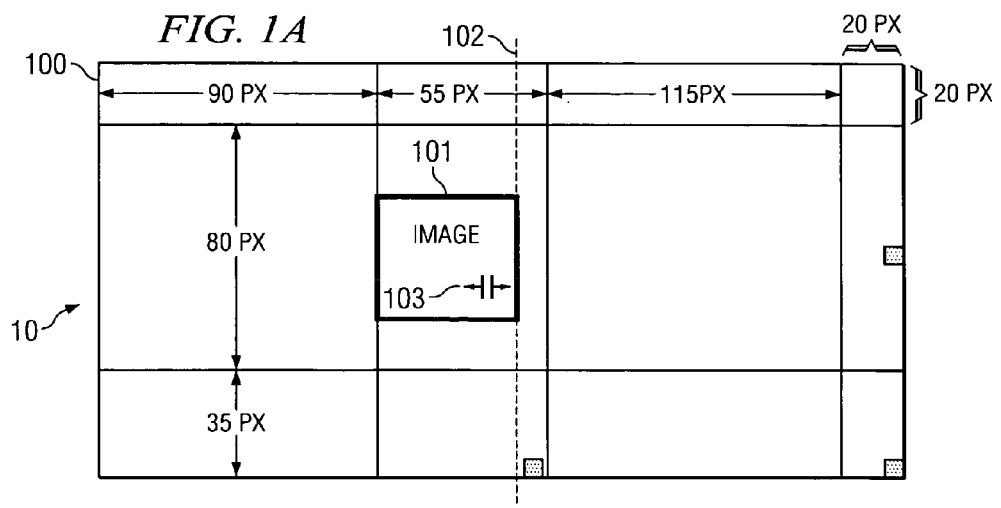
FIG. 1A is a block diagram illustrating an HTML table within an editor having table editing functions configured according to one embodiment of the present invention.

FIG. 1A is a block diagram illustrating HTML table 10 within an editor having table editing functions configured according to one embodiment of the present invention. Table 10 is shown as a 3-by-3 table having nine individual cells. Within row 100, the column widths are given in pixels (px). Table 10 includes image 101 in the center cell. When a user desires to visually edit table 10 by changing the width of center column 104, the cursor is situated over the column border. By performing this action, cell edit cursor 103 appears indicating to the user that the border may be edited. When the user clicks the pointing device, edit guide 102 appears along the axis of the contemplated edit. If the user desires to decrease the width of center column 104, edit guide 102 is dragged to the left. However, when edit guide 102 reaches the width of image 101, edit guide 102 visibly stops regardless of the user continuing to drag cell edit cursor 103 further. When the user lets go, the new cell border snaps into position at the width of image 101 at the exact spot were edit guide 102 visibly stopped.

Figure 1B:
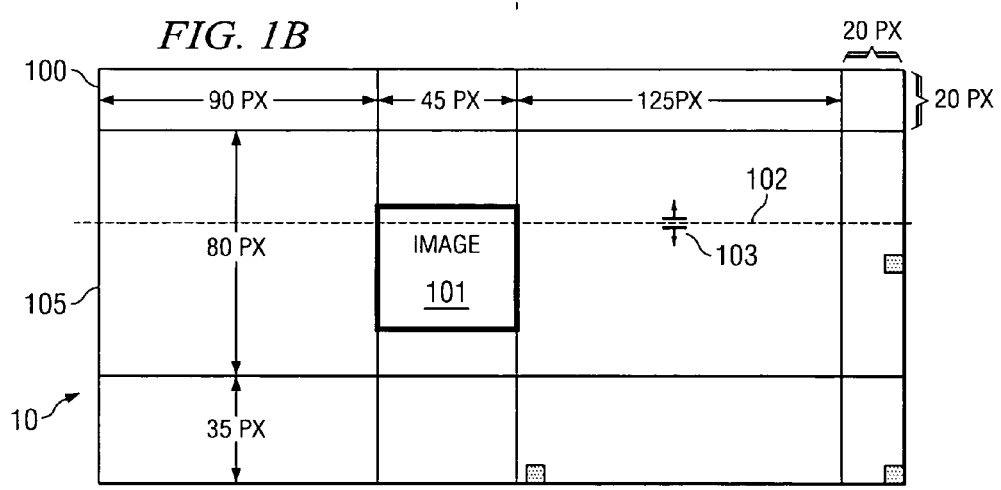
FIG. 1B is a block diagram illustrating an edited version of a table within a table editor configured according to one embodiment of the present invention.

By editing table 10 in the embodiment illustrated in FIG. 1A, accurate visual feedback is given to the user/developer. FIG. 1B is a block diagram illustrating an edited version of table 10 within a table editor configured according to one embodiment of the present invention. Following the edit of table 10 that was implemented in FIG. 1A, center column 104's new width is shown in row 100 to be 45 pixels, which is the width of image 101. Thus, the user/developer was unable to make the column width of center column 104 any narrower than the width of image 101. The table editor controlling the edits in FIGS. 1A and 1B, operates in the same manner for editing table or cell heights as for widths.

Figure 1C:
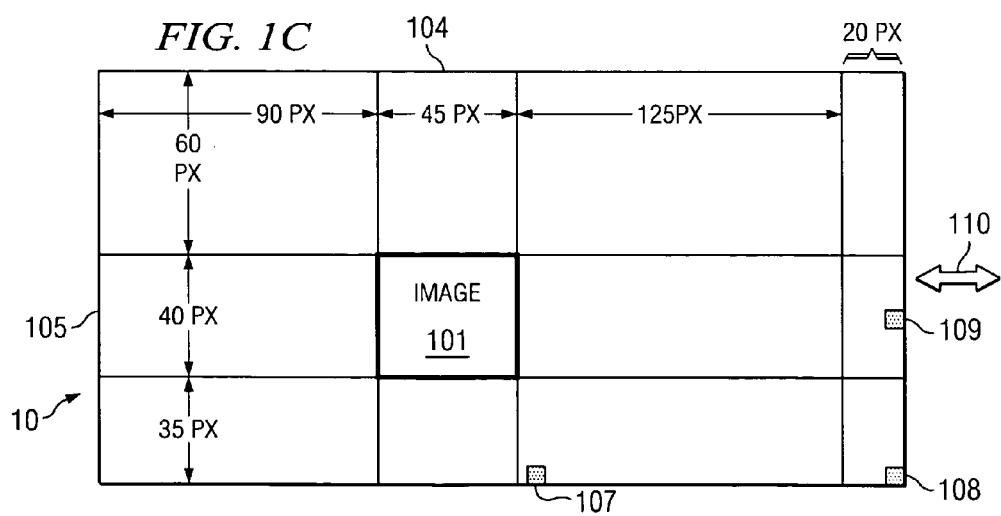
FIG. 1C is a block diagram illustrating the edited version of the table shown in FIGS. 1A and 1B.

For example, if the user desires to shorten the height of center row 105, shown in column 106 to be 80 pixels high, the cursor is situated over one of the borders of center row 105. Cell edit cursor 103 appears and when the user clicks the pointing device, edit guide 102 also is shown. The user may then drag edit guide 102 down to shorten center row 105. However, as with the width editing shown in FIG. 1A, when the height of center row 105 reaches the height of image 101, edit guide 102 is visibly stopped regardless of how much further the user continues to drag cell edit cursor down. When the user/developer releases the pointing device, the new row border will snap to the lowest position allowed by the height of image 101. FIG. 1C is a block diagram illustrating the edited version of table 10. Table 10 is shown resulting with a width of center column 104 of 45 pixels and a height of center row 105 of 40 pixels. Thus, the new configuration of table 10 has been edited limited by the minimum height and widths dictated by cell content, image 101.

FIG. 1 also depicts table sizing handles 107-109 that allow the user/designer to resize the entire table, as opposed to resizing/editing the individual rows and columns. Most existing table editors do not distinguish between resizing the row/column and the table when an outer border is changed. The existing table editors generally resize the entire table distributing the resized dimensions over the each row/column. When the user desires to resize the table in the embodiment of the present invention shown in FIG. 1, the cursor is placed over one of table sizing handles 107-109. For example, to change the width of table 10, the user/developer would place the cursor over table sizing handle 109. The resulting table resize cursor 110 is presented to the user indicating, in a different manner than cell edit cursor 103, that the user may change the width of table 10. If the user uses an outer border (and not a table sizing handle) the outer row or column will be sized instead.

In order to implement the favorable editing attributes of the embodiment of the table editor illustrated in FIG. 1, table heights and widths need to be maintained consistently. The present invention accomplishes this consistency by tracking and enforcing a minimum row/column width and height. By using these minimums, the table editor configured according to various embodiments of the present invention is capable of reflecting edits that are bounded by those minimums. This allows more consistent and reliable visual edits.

Figure 2:
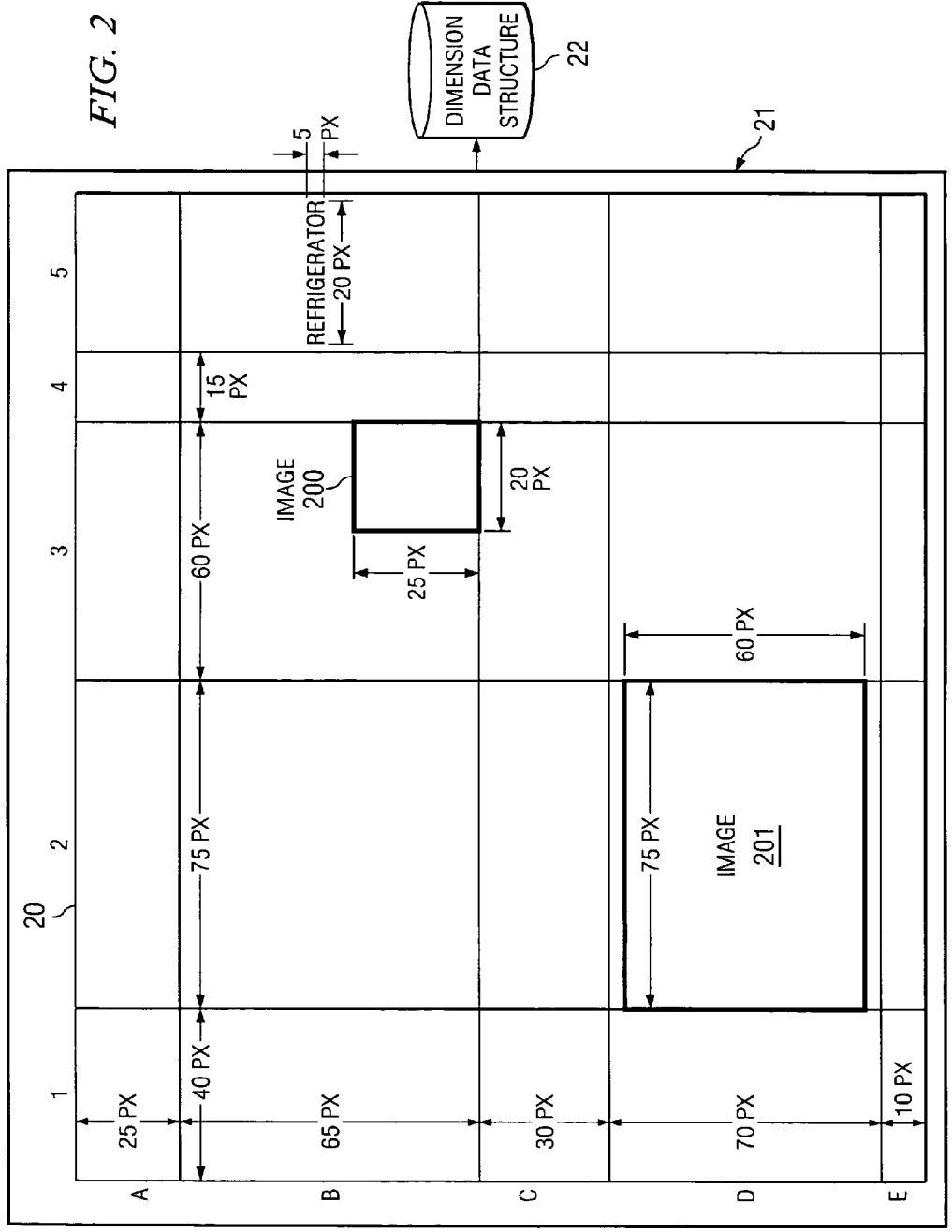
FIG. 2 is a block diagram illustrating a table generated by an HTML editor having table editing configured according to an embodiment of the present invention.

FIG. 2 is a block diagram illustrating table 20 generated by an HTML editor having table editing configured according to an embodiment of the present invention. An HTML editor that includes such table editing features is MACROMEDIA's DREAMWEAVER MX™. An additional feature of the present invention optimizes table generation and maintenance by minimizing the placement of explicit table/cell heights and widths. Web browsers do not require height and width parameters in every cell in order to properly render that cell. Therefore, by minimizing the explicit table/cell heights and widths the table becomes much less code-bulky and also becomes easier to manage.

Instead of placing a height and width attribute on every cell of table 20, the embodiment of the present invention illustrated in FIG. 2 places a width parameter in the first non-colspanned cell and places a height parameter in the first non-rowspanned cell. Colspanned and rowspanned cells are essentially merged cells, either merged with an adjacent row cell or an adjacent column cell. These merged cells do non typically have an explicit height or width. The height and/or width of the merged cells generally is the sum of the individual merged cell's height and/or width. Cell A1 in table 20 is shown having both height 25 and width 40. Cell A1 is the first non-colspanned and rowspanned cell for both row A and column 1. Therefore, both parameters are included. Further, the remainder of the cells in row A are non-colspanned cells, and thus each includes a width parameter. Similarly, the remainder of the cells in column 1 are non-rowspanned cells, and thus include a height parameter. By optimizing the parameterization of table 20, its underlying code only includes 10 height/width parameters, compared to 50[25 heights and 25 widths] height/width parameters that would be present in tables created using existing table editors.

Each time an edit is performed within a table editor configured according to the various embodiments of the present invention, a determination is made of the actual dimensions, the minimum dimensions, and the maximum dimensions. This information may be placed into a data structure associated with the particular table. In the embodiment present in FIG. 2, each time an edit is performed, the table is parsed three times. Parsing the table interprets the content and design of the table code. Content that may effect the minimum dimension attributes of the table include such items as images, text, another table, a horizontal rule (e.g., <hr>), a plugin (e.g., <object>, <embed>), or some kind of form control (e.g., <input>, <textarea>, <select>), or the like. The first parsing may determine the actual dimensions of the table, the second may determine the minimum dimensions, while the third may determine the maximum dimensions. These values are then placed in dimension data structure 22 for reference in any further editing procedures.

When table 20 is generated, the table editor discovers the actual widths and stores those in dimension data structure 22. The table editor then discovers the minimum dimensions by examining the contents of table 20. For example, cell D2 includes image 201 with a height of 60 pixels and a width of 75 pixels, the actual width of column 2. Because there are no other limiting elements in row D, the minimum height of row D is set to 60 pixels. Furthermore, because there are no other limiting elements in column 2, the minimum width of column 2 is set to 75 pixels. Similar calculations are performed for image 200. Cell B5 includes a long word "refrigerator" which will also restrict the width of column 5 to 20 pixels. This minimum dimension information is then stored in dimension data structure 22. Finally, the table editor determines that page border 21 restricts the maximum size of the table. Also, calculations are performed to determine the maximum dimensions of each row and column based on the surrounding minimum dimensions. This maximum dimension information is then also stored in dimension data structure 22. As table 20 is further edited, the table editor refers to dimension data structure 22 to control any visual editing indicators and the actual edits applicable to the table. The visual editing performed in FIG. 1 by the table editor would have compared the dimension information within dimension data structure 22 to the position of edit guide 102 (FIG. 1) and as soon as its position corresponded to the associated minimum (or maximum) dimension, the table editor stopped edit guide 102 from exceeding that minimum (or maximum) dimension.

Tables generated using the various embodiments of the described table editors produce content that is easily maintainable. However, many Web sites in existence were originally generated using existing HTML editors with existing table editing functionality. Thus, they may not share the same ease of maintenance when editing in the table editors described herein because most have the cell height/width entered in every cell of the table. To accommodate such legacy table code, the present invention incorporates several rules and heuristics to apply its favorable cell consistency attribute.

The table editing features of the various embodiments of the present invention provide many different favorable features to accommodate legacy tables. Functions, such as resizing rows/columns, inserting rows/columns, deleting rows/columns, and merging cells, include additional functionality to ensure the consistency of table dimensions of legacy tables.

Table 1 illustrates the options applied when resizing legacy tables. Heights and widths are generally handled in the same fashion and are designated in the tables as "w/h."

TABLE 1

RESIZING

| TABLE CONFIGURATION | ACTION TAKEN |
|---|---|
| No w/h on any cell. | Resized w/h placed on first non-colspanned (w) or non-rowspanned (h) cell in the column or row. |
| W/h only on one cell. | Resized w/h placed only on cell having the w/h. |
| W/h on more than one or all cells. | The same resized w/h will be placed on all cells previously having an indicated w/h. |
| No w/h on the <table> tag. | No w/h are inserted into the <table> tag unless the user resizes the table using the table resizing handles. |
| W/h on the <table> tag. | The w/h of the <table> tag will not be changed, but the column or row widths/heights will be adjusted so they add up to the table w/h including any padding, spacing, etc. |

Thus, the various embodiments of the present invention attempt to force consistency across the table, but do so by replacing each instance of a width or height parameter in the table.

When inserting columns/rows into legacy tables, the various embodiments of the present invention simply clear all the w/h parameters of the inserted column/row. Because the previous column/row's dimension parameters will be applied to the inserted column/row by the Web browser, there is generally no need to do anything further.

Table 2 illustrates the options applied when deleting columns/rows from legacy tables. Heights and widths are again generally handled in the same fashion and are designated in the tables as "w/h."

TABLE 2

DELETING

| TABLE CONFIGURATION | ACTION TAKEN |
|---|---|
| No w/h specified on any cells being deleted. | No action. |
| 1. Column/row contains only w/h in column/row. | 1. W/h moved to first non-colspanned (w) or first non-rowspanned (h) cell in column/row. |
| Column/row contains inconsistent w/h and is larger than other w/h entries. | The deleted, larger w/h is set on all remaining cells in column/row to make consistent. |
| Column/row contains inconsistent w/h and is smaller than other w/h entries. | No action. |

Table 3 illustrates the options applied when merging columns/rows in legacy tables. Merging presents that issue that if the merged cell includes the w/h that defines the w/h for a particular column/row, the various embodiments of the present invention do not want to lose that information.

TABLE 3

MERGING

| TABLE CONFIGURATION | ACTION TAKEN |
| --- | --- |
| Merged cell contains a w/h that defines the corresponding column/row w/h. | W/h moved to first non-colspanned (w) or first non-rowspanned (h) cell in that column/row. |
| Merged cell contains inconsistent w/h and is larger than other w/h entries. | The merged, larger w/h is set on all remaining cells in column/row to make consistent. |
| Merged cell contains inconsistent w/h and is smaller than other w/h entries. | No action. |

Other editing features such as cut/copy/paste generally follow the same guidelines used for the resizing/inserting/deleting/merging sequence of features. Therefore, by forcing consistency within each table, whether generated in the efficient configuration of the various embodiments of the present invention, or generated in legacy table editors, the present invention may beneficially maintain the table and increase the reliability and efficiency of future table edits.

When implemented in software, the elements of the present invention are essentially the code segments to perform the necessary tasks. The program or code segments can be stored in a computer readable medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, and the like. The code segments may be downloaded via computer networks such as the Internet, Intranet, and the like.

FIG. 3 illustrates computer system 300 adapted to use the present invention. Central processing unit (CPU) 301 is coupled to system bus 302. The CPU 301 may be any general purpose CPU, such as an INTERNATIONAL BUSINESS MACHINE (IBM) POWERPC™, INTEL™ PENTIUM™-type processor, or the like. However, the present invention is not restricted by the architecture of CPU 301 as long as CPU 301 supports the inventive operations as described herein. Bus 302 is coupled to random access memory (RAM) 303, which may be SRAM, DRAM, or SDRAM. ROM 304 is also coupled to bus 302, which may be PROM, EPROM, EEPROM, Flash ROM, or the like. RAM 303 and ROM 304 hold user and system data and programs as is well known in the art.

Bus 302 is also coupled to input/output (I/O) controller card 305, communications adapter card 311, user interface card 308, and display card 309. The I/O adapter card 305 connects to storage devices 306, such as one or more of a hard drive, a CD drive, a floppy disk drive, a tape drive, to the computer system. The I/O adapter 305 would also allow the system to print paper copies of information, such as documents, photographs, articles, etc. Such output may be produced by a printer (e.g. dot matrix, laser, and the like), a fax machine, a copy machine, or the like. Communications card 311 is adapted to couple the computer system 300 to a network 312, which may be one or more of a telephone network, a local (LAN) and/or a wide-area (WAN) network, an Ethernet network, and/or the Internet network. User interface card 308 couples user input devices, such as keyboard 313, pointing device 307, to the computer system 300. The display card 309 is driven by CPU 301 to control the display on display device 310.

FIG. 4 is a flowchart illustrating representative method 40 and the steps executed in implementing one embodiment of the present invention. In step 400, code representing the table is analyzed to determine dimension parameters, such as a height and width of the cells, based on content of the table, such as images or text, wherein the analyzing includes paginating code representing the table to determine actual values of said dimension parameters, paginating the code to determine minimum values of the dimension parameters, and paginating the code to determine maximum values of the dimension parameters. In step 401, the dimension parameters are stored in a memory. In step 402, text or graphical edit indications are received from a user. In step 403, the edit indications are concurrently compared against the dimension parameters, wherein edit indications that exceed the dimension parameters are graphically or textually rejected. Each instance of the dimension parameters within the code are then updated with the edit indications in step 404.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for editing a table within a hypertext markup language (HTML) editor, said method comprising:
   analyzing code representing said table to determine dimension parameters based on content of said table;
   storing said dimension parameters in a memory;
   receiving edit indications from a user;
   concurrently comparing said edit indications against said dimension parameters, wherein edit indications that exceed said dimension parameters are rejected; and
   updating each instance of said dimension parameters within said code with said edit indications.

2. The method of claim 1 wherein said dimension parameters comprise:
   a height of a cell; and
   a width of said cell.

3. The method of claim 2 wherein said updating includes:
   recording said height in a first cell of a row, wherein said row is non-rowspanned; and
   recording said width in a first cell of a column, wherein said column is non-colspanned.

4. The method of claim 1 wherein said analyzing includes:
   parsing said code to determine actual values of said dimension parameters;
   parsing said code to determine minimum values of said dimension parameters; and
   parsing said code to determine maximum values of said dimension parameters.

5. The method of claim 1 wherein said content of said table comprises at least one of:
an image;
a text word;
another table;
a horizontal rule;
a plugin; and
a form control.

6. The method of claim 1 wherein said edit indications comprise:
graphically manipulating said table visually presented on a graphical user interface (GUI).

7. The method of claim 6 further comprising:
preventing visual representation of said graphical manipulation from exceeding said dimension parameters.

8. A computer program product having a computer readable medium with computer program logic recorded thereon, which when executed by a computer causes the computer to perform a method comprising:
analyzing cell contents of said table to determine measurements of said table;
storing said measurements in a data structure;
receiving edits from a user;
comparing said edits against said measurements, wherein edits that exceed said measurements are rejected; and
updating each instance of said measurements with said edit indications.

9. The computer program product of claim 8 wherein said measurements comprise:
a height of a cell; and
a width of said cell.

10. The computer program product of claim 9 wherein said updating includes:
documenting said height in a first cell of a row, wherein said row is non-rowspanned; and
documenting said width in a first cell of a column, wherein said column is non-colspanned.

11. The computer program product of claim 8 wherein said analyzing includes:
parsing said table to determine actual values of said measurements;
parsing said table to determine minimum values of said measurements; and
parsing said table to determine maximum values of said measurements.

12. The computer program product of claim 8 wherein said cell content comprises at least one of:
an image;
a text word;
another table;
a horizontal rule;
a plugin; and
a form control.

13. The computer program product of claim 8 wherein said edits comprise:
graphically accepting user manipulation of said table on a graphical user interface (GUI).

14. The computer program product of claim 13 wherein said method further comprising:
preventing visual representations of said graphically accepted user manipulation to exceed said measurements.

15. A table editor within a hypertext markup language (HTML) editor, said table editor comprising:
means for determining width and height cell attributes of said table;
means for storing said width and height cell attributes in a data structure based on cell contents;
means for reading edits from a user;
means for comparing said edits against said width and height cell attributes, wherein edits that exceed said width and height cell attributes are ignored; and
means for updating each instance of said width and height cell attribute with corresponding ones of said edit indications.

16. The table editor of claim 15 wherein said width and height cell attributes comprise at least one of:
an actual cell height;
an actual cell width;
a minimum cell height;
a minimum cell width;
a maximum cell height; and
a maximum cell width.

17. The table editor of claim 16 wherein said means for updating includes:
means for updating said height cell attribute in a first cell of a row, wherein said row is non-rowspanned; and
means for updating said width cell attribute in a first cell of a column, wherein said column is non-colspanned.

18. The table editor of claim 15 wherein said cell contents comprises at least one of:
an image;
a text word;
another table;
a horizontal rule;
a plugin; and
a form control.

19. The table editor of claim 15 wherein said edits comprise:
means for graphically accepting user manipulation of said table on a graphical user interface (GUI).

20. The table editor of claim 19 further comprising:
means for providing visual representations of said user manipulation within said width and height cell attributes.

* * * * *

UNITED STATES PATENT AND TRADEMARK OFFICE
CERTIFICATE OF CORRECTION

PATENT NO. : 7,421,649 B1  Page 1 of 1
APPLICATION NO. : 10/424561
DATED : September 2, 2008
INVENTOR(S) : Heidi B. Williams It is certified that error appears in the above-identified patent and that said Letters Patent is hereby corrected as shown below:

In the specification:

Column 5, Line 3, delete the portion of text reading "50[25 heights and 25 widths]" and replace with --50 [25 heights and 25 widths]--.

In the claims:

Column 9, Claim 8, Lines 20-21, delete the portion of text reading "of said table to determine measurements of said table" and replace with --of a table to determine measurements of said table--.

Column 10, Claim 15, Line 13, delete the portion of text reading "said table" and replace with --a table--.

Signed and Sealed this

Twenty-first Day of October, 2008

JON W. DUDAS
*Director of the United States Patent and Trademark Office*